April 18, 1933.    M. H. BISSELL    1,904,818
CLEANING APPARATUS
Filed April 20, 1929
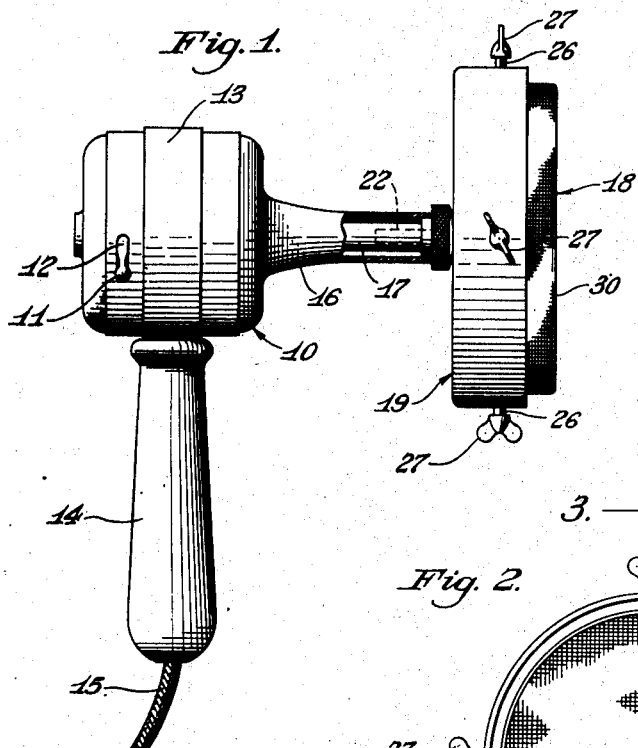
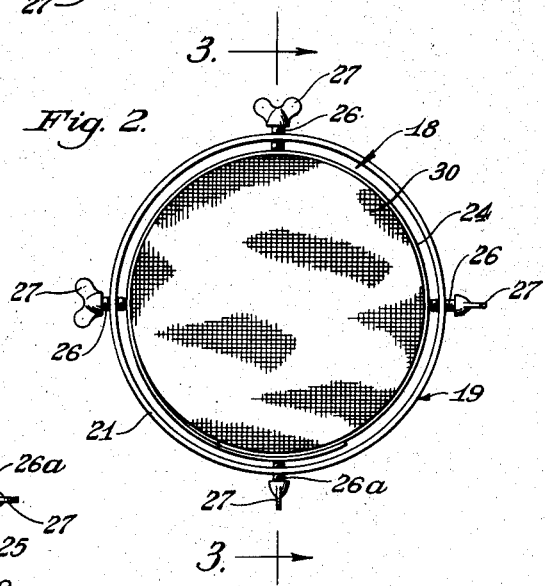
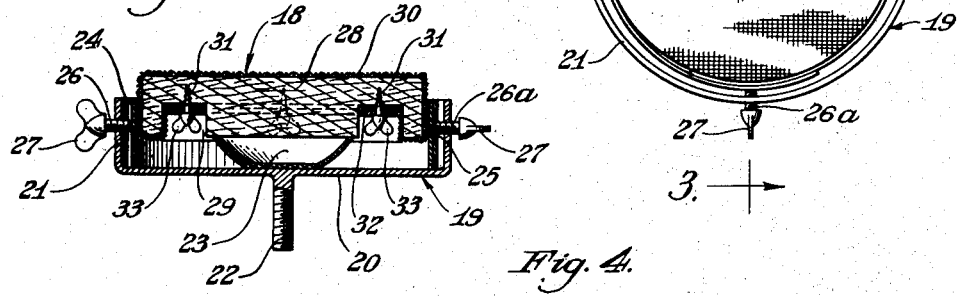
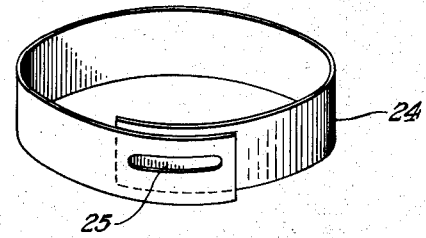
Marion H. Bissell,
INVENTOR
BY Victor J. Evans & Co.
HIS ATTORNEYS Patented Apr. 18, 1933

1,904,818

UNITED STATES PATENT OFFICE

MARION H. BISSELL, OF CHICAGO, ILLINOIS

CLEANING APPARATUS

Application filed April 20, 1929. Serial No. 356,854.

This invention relates to certain novel improvements in cleaning apparatus and has for its principal object the provision of an mproved construction of this character which wll be highly efficient in use and economical in manufacture.

It is among the objects of my invention to provide improved power operated cleaning apparatus.

Other objects will appear hereinafter.

The invention consists in the novel combination and arrangements of parts to be hereinafter described and claimed.

The invention will be best understood by reference to the accompanying drawing, showing the preferred form of construction and in which:

Fig. 1 is an elevational view depicting a preferred form of construction for my invention showing one of my cleaning members secured to the operating portion of my device;

Fig. 2 is a plan view of my improved cleaning member;

Fig. 3 is a sectional view taken substantially on the line 3—3 on Fig. 2;

Fig. 4 is a perspective detail view.

In the accompanying drawing wherein I have illustrated a preferred form of construction for my invention 10 indicates an electric motor which may be of any approved form but which includes in the present instance a speed varying mechanism which is operated by the handle 11 that protrudes through a slot 12 formed in the housing of the motor 10. While this is the arrangement shown it is to be understood that any desired electric motor might be provided without departing from the purview of my invention.

In the present instance a band 13 is shown as being disposed around the motor 10 and serves to connect the motor 10 to the handle 14. In the present instance the current carrying conductors 15 are directed through the handle 14 to the motor 10.

Extending out from one end of the frame of the motor 10 is an elongated sleeve 16 through which the shaft 17 of the motor extends. The above described arrangements are the preferable form of construction for my invention but it is to be understood that this specific arrangement might be departed from without departing from the purview of my invention.

In the present instance I show one form of my improved cleaning mechanisms in association with the mechanisms heretofore described and this improved cleaning mechanism is indicated generally by 18. By referring to Fig. 3 it may be seen that the cleaning member 18 includes a substantally cylindrical shaped member 19 that comprises a relatively flat portion 20 around which a projecting rim 21 is provided. To substantially the midpoint of the section 20 of the member 19 a threaded stud 22 is secured and the threaded stud 22 is intended to be screw threadedly fitted into an opening formed in the motor shaft 17 and the lead of the threads on the stud 22 is preferably in the direction of rotation of the shaft 17 in order that the rotative movement imparted to the shaft will tend to more securely retain the stud 22 in position.

In the preferred form of the invention shown a suitable substantially circular block 28 is provided which has a groove 29 formed therein adjacent the periphery thereof and the groove 29 extends into block 28 from one face thereof. A covering of textile material 30 is disposed over the face of the block 28 opposite that into which the groove extends and this cloth 30 is extended outwardly over the sides of the block and inwardly to the groove 29 so as to extend across the lower face thereof. In this instance a plurality of studs 31 extend into the groove 29 from the bottom thereof through the section of cloth disposed therein. A ring 22 has openings therein through which the studs 31 may extend in order that the ring 32 may be disposed over the section of cloth at the bottom of the groove 29. Wing nuts 33 are arranged on the studs 31 to retain the ring 32 in position.

The member 19 embodies a substantially cup-shaped member 23 which is preferably formed from flexible material. A ring of yielding material indicated by 24 is disposed interiorly of the rim 21. The ends of the ring 24 overlap each other and a slot 25 is provided in one of the ends while a stud bolt 26a threaded into rim 21 projects through the slot 25. Wing heads 27 are provided on bolts 26 to force the same into engagement with the ring 24 and the latter into engagement with the portion of cloth 30 that is disposed between block 28 and ring 24. The cup-shaped member 23 engages an inwardly disposed surface of the block 28 and by forcing the block so as to slightly depress the cup-shaped member 23 and then releasing the same a partial vacuum may be defined in the cup-shaped member 23 which is sealed by the engagement of the surface of the block 28 with this cup-shaped member 23. This partial vacuum in co-operation with the yielding ring 24 serves to very effectively retain the block 28 in the member 19 and in this manner the block 28 is connected to the member 19 so that it will be rotated with said member 19 when the stud 22 is connected to the shaft 17.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. A device of the character described comprising a member including a plate and a rim around and upstanding from the plate, a member adapted to be disposed within the rim, means for retaining said second-named member on said first-named member, a resilient split ring disposed within the rim between the rim and the second-named member, a cleaning member including a portion extended across one side of said second-named member and including a portion disposed between the ring and the second-named member, means for contracting the ring to bind the said second-named portion of the cleaning member against the second-named member and means to rotate said device.

2. A device of the character described, comprising a member including a plate and a rim around and upstanding from said plate, a resilient split ring disposed within said rim, a cleaning element holding member including a portion disposed within said ring, a cleaning element having a portion extended over said holding member, means carried by said rim for contracting said ring into binding engagement with said holding member portion to retain the latter within said ring, and means for rotating said device.

In testimony whereof I affix my signature.

MARION H. BISSELL.